(12) United States Patent
Freakes

(10) Patent No.: US 8,643,256 B2
(45) Date of Patent: Feb. 4, 2014

(54) ELECTRIC MOTORS

(76) Inventor: Anthony Freakes, Skillman, NJ (US)

( * ) Notice: Subject to any disclaimer, the term of this patent is extended or adjusted under 35 U.S.C. 154(b) by 291 days.

(21) Appl. No.: 13/156,149

(22) Filed: Jun. 8, 2011

(65) Prior Publication Data

US 2011/0298312 A1 Dec. 8, 2011

Related U.S. Application Data

(60) Provisional application No. 61/352,578, filed on Jun. 8, 2010, provisional application No. 61/353,473, filed on Jun. 10, 2010.

(51) Int. Cl.
*H02K 5/00* (2006.01)

(52) U.S. Cl.
USPC .......................................... 310/400; 310/135

(58) Field of Classification Search
USPC ..................................... 310/46, 400, 132–148
See application file for complete search history.

(56) References Cited

U.S. PATENT DOCUMENTS

| | | | |
|---|---|---|---|
| 2,952,788 A | 9/1960 | Völkerling, et. al. | |
| 3,991,331 A | 11/1976 | Noodleman | |
| 4,149,114 A | 4/1979 | Gorjan | |
| 4,645,962 A * | 2/1987 | Freeman | 310/232 |
| 5,214,335 A | 5/1993 | Phillips | |
| 2004/0140724 A1* | 7/2004 | Higuchi | 310/156.06 |
| 2005/0077789 A1 | 4/2005 | Kusumoto et al. | |
| 2009/0091211 A1* | 4/2009 | Huan et al. | 310/265 |
| 2010/0301694 A1* | 12/2010 | Spaggiari | 310/140 |
| 2011/0241475 A1* | 10/2011 | Kirchner et al. | 310/234 |

OTHER PUBLICATIONS

International Search Report and Written Opinion for corresponding PCT Application No. PCT/US2011/039648, Oct. 4, 2011 (PCT/ISA/220/210/237).

International Preliminary Report on Patentability for corresponding PCT application PCT/US11/39648, dated Dec. 20, 2012.

* cited by examiner

*Primary Examiner* — Thanh Lam

(74) *Attorney, Agent, or Firm* — Timothy X. Gibson, Esq.; Gibson & Dernier LLP

(57) ABSTRACT

Electric motors are disclosed with coils which induce a magnetic flux field which by its relationship with ferromagnetic poles provide the motoring force without use of an auxiliary magnetic field. The motors may be employed with fixed or pivotably mounted brushes. Pivotable brushes for electric motor brushes are disclosed.

21 Claims, 10 Drawing Sheets

ELECTRIC MOTORS

CROSS-REFERENCE TO RELATED APPLICATIONS

This application claims the benefit of U.S. Provisional Patent application Ser. Nos. 61/352,578, filed Jun. 8, 2010 and 61/353,473 filed Jun. 10, 2010, the disclosures of which are incorporated in their entirety by reference herein.

FIELD OF THE INVENTION

The invention relates to the field of electric motors. More specifically, it relates to simplified, low cost, compact, high power, easily reversed, easily maintained electric motors with coils which induce a magnetic flux field which by its relationship with ferromagnetic poles provide the motoring force.

BACKGROUND OF THE INVENTION

A "universal" prior art motor, such as is shown in FIG. 1, is an electric series wound motor which can run on AC or DC power. Such motors are small, frequently connected directly to standard 110 volt AC power and run at high speed. They are generally employed in hand-held and counter top appliances such as mixers, hand drills, vacuum cleaners and in gardening tools such as edge trimmers and leaf blowers.

Such motors use two field coils wound around two poles for creating a magnetic field in the stator and a rotor with many coils (usually twelve) "wave" wound around the rotor in the rotor slots so that parts of the rotor coil conductor turns lie parallel to the rotor axis. The rotor coils are connected to the commutator pads (usually twelve). Two brushes, which are connected in series with the stator field coils, contact the commutator. The power is connected to the field coils and the speed of the motor is varied by a simple power supply which varies the voltage. When an electric current flows through the conductors of the rotor coils, which are in the magnetic field, the conductors feel a force which turns the rotor about its axis.

No other design has yet as effectively satisfied the special niche need for high speed, variable speed and low cost in small appliances as has the "universal" motor. Typically the speed required in such devices is above 10,000 rpm. Such high speed electric motors deliver high power in a relatively small lightweight package at a low price. The "universal" motor also meets the requirement for smaller motors in hair blowers. In these devices, the motor usually has permanent magnets replacing the stator field coils.

Regardless of whether a stator has coils or permanent magnets for generating magnetic flux, the coils in the rotor also produce a magnetic field which according to some literature "distorts and opposes" the main stator field. This is termed "rotor reaction" and is considered a detriment to efficient motor action.

In the currently used universal motors, with field coils, the longitudinal length of the conductors in the wound rotor is an important parameter because it is the interaction of the conductors with the stator's magnetic field which produces the torque. This torque is found to be approximately proportional to the longitudinal length of the rotor conductors. Therefore, the "bank" of coils in the wound rotor need only be a single "bank" and be whatever length produces the torque desired. The wound rotor purpose is to provide as many conductors, arranged longitudinally, as can be fitted in the space. If there were some other way to do this other than making coils it may still function. The coils are incidental, not essential.

Currently, available universal motors use brushes which are linearly guided and must be connected to electrical power via flexible pigtails. This requires an arrangement which is costly, fragile and subject to breakage and is difficult to service.

Two other types of electric motor have been built. They are the variable reluctance, and the switched reluctance motors. These motors have advantages of low cost through the elimination of unnecessary copper but have severe disadvantages of torque variation (ripple) and acoustic noise which, so far, is only partly mitigated by expensive tailored electronically controlled drives.

SUMMARY OF THE INVENTION

In accordance with one embodiment a motor is disclosed which has an operational profile similar to a universal motor, but is built without the auxiliary field coils. This motor does not use electromagnetic induction to cause conductors to provide torque, but derives its torque and usefulness from the magnetic circuit actively attempting to reduce reluctance.

The present inventor has found that if an "off the shelf" universal motor is connected to power directly to the brushes circumventing the field coils, the motor turns strongly in the opposite direction to which it was designed. Without being confined to a single theory, the inventor deduced from this experiment that there are two turning forces developed in the universal motor, one being positive from the point of view of the intended action, and the other being negative. Obviously, the positive force is stronger, but although the addition of the positive and the negative force gives the resultant intended force, it is possible for the negative force to be equal or greater than the resultant force but in the opposite direction. So, if the positive force is eliminated, then the negative force alone could produce a stronger motor which turns in the opposite direction and be more efficient.

Based on the foregoing observation, in accordance with one embodiment a motor having a rotor with coils and a stator without the field coils or permanent magnets is disclosed. A small air gap, about 0.008 inches to about 0.025 inches, separates the rotor and the stator surrounding it. The coils in the rotor are wound and connected to the commutator in a manner that induces many superimposed flux fields. The resultant flux from all the energized coils flows diametrically through the rotor, and therefore can be misaligned with the pole plane to produce a torque to turn the rotor. This embodiment has some features in common with a universal motor in that the stator which contains the poles and defines the path of the magnetic circuit is in the form of a ring whose cylindrical axis is aligned with the axis of the motor, however does not include field coils or permanent magnets.

In accordance with another embodiment a motor is disclosed which provides two separate banks of coils in the rotor which have resultant magnetic flux fields which are in opposite direction to each other but which are angularly aligned. This arrangement enables the magnetic circuit to be arranged so its central axis is perpendicular to the axis of the motor.

In accordance with yet another embodiment, a motor having stationary coils and commutator is disclosed, in which the brushes, the poles, the magnetic flux field and the load are rotatable. The electric input power may be connected to the brushes via slip rings. The windings and commutator are externally stationary, while the poles, the brushes, the magnetic flux field and the load are rotatable. The electric input power may be connected to the brushes via slip rings.

While this embodiment is similar in construction to the stepping motor, the variable reluctance motor and the switched reluctance motor, in operation, it, like the other embodiments disclosed herein, maintains the condition of torque producing high reluctance and eliminates the pulsations of amperage and torque which are evident in prior art reluctance motors, with no need for costly electronic control.

In another embodiment a brush assembly for an electric motor is disclosed having a brush and a spring, the brush operable to pivotably connect at one end to a motor part which is fixed relative to the brush, the spring operable to connect at one end to the brush and at another end to a motor part which is fixed relative to the brush, the brush having a free end positionable to contact a commutator. The brush assembly may further include a pivot pin extending from the end of the brush operable to pivotably connect at one end to a motor part which is fixed relative to the brush. The brush assembly may include an opening operable to receive an electrical lead. The brush assembly disclosed herein may be used in conjunction with any known electrical motor which employs brushes.

Given above is a simplified summary in order to provide a basic understanding of some aspects described herein. This summary is not an extensive overview, and is not intended to identify key/critical elements or to delineate the scope of the claimed subject matter.

BRIEF DESCRIPTION OF THE DRAWINGS

So that those having ordinary skill in the art will have a better understanding of how to make and use the disclosed systems and methods, reference is made to the accompanying figures wherein.

DETAILED DESCRIPTION OF THE INVENTION

The following is a detailed description of the invention provided to aid those skilled in the art in practicing the present invention. Those of ordinary skill in the art may make modifications and variations in the embodiments described herein without departing from the spirit or scope of the present invention. Unless otherwise defined, all technical and scientific terms used herein have the same meaning as commonly understood by one of ordinary skill in the art to which this invention belongs. The terminology used in the description of the invention herein is for describing particular embodiments only and is not intended to be limiting of the invention. All publications, patent applications, patents, figures and other references mentioned herein are expressly incorporated by reference in their entirety.

Figure 1:
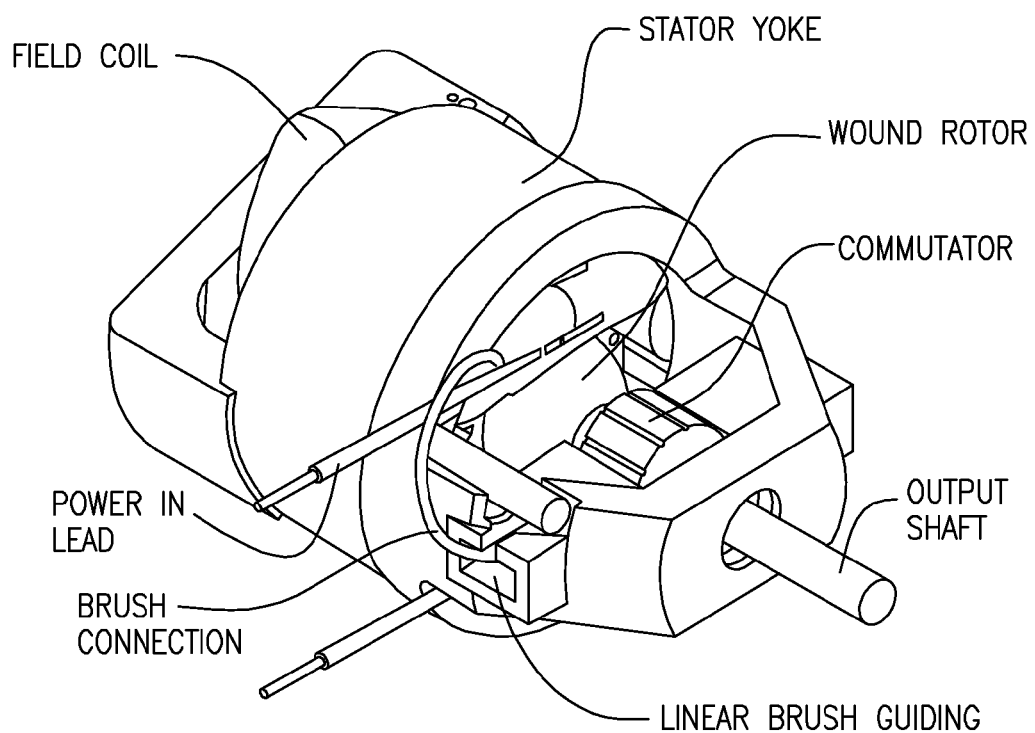
FIG. 1 is a perspective view of a universal motor built according to prior art.

FIG. 1 depicts a prior art universal motor.

Figure 2:
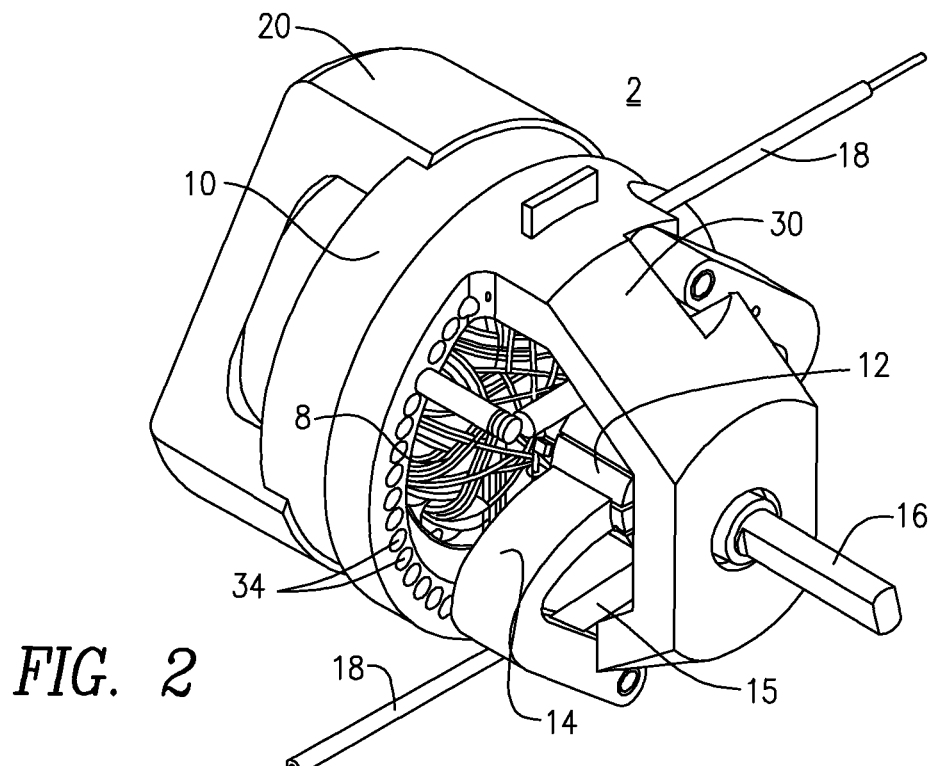
FIG. 2 is a perspective view of a motor according to one embodiment of the disclosed subject matter.
Figure 2A:
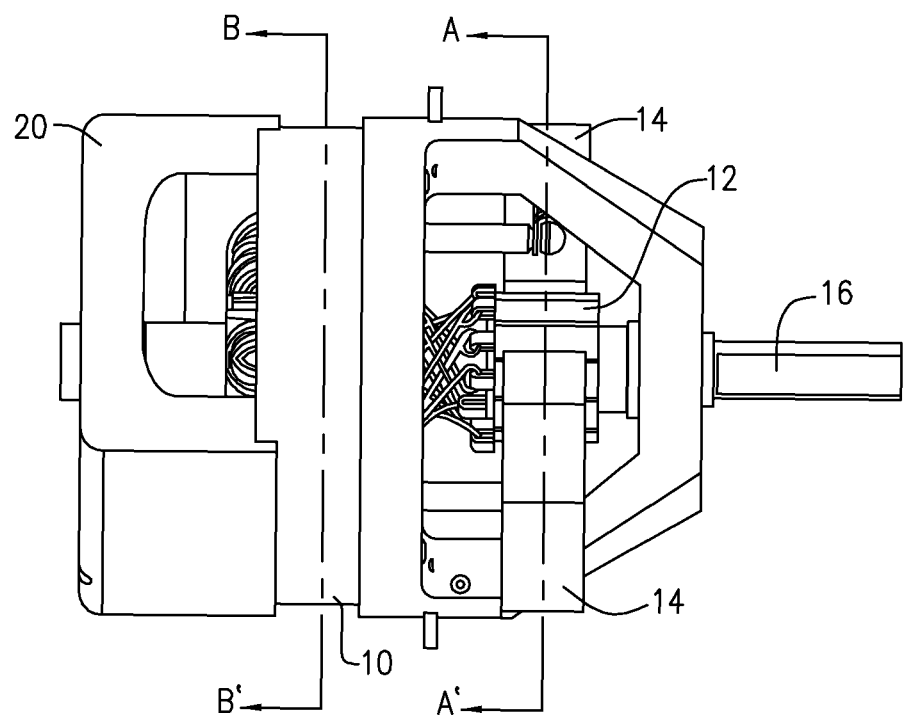
FIG. 2A is a side view of the motor of FIG. 2 with section planes indicated.
Figure 2B:
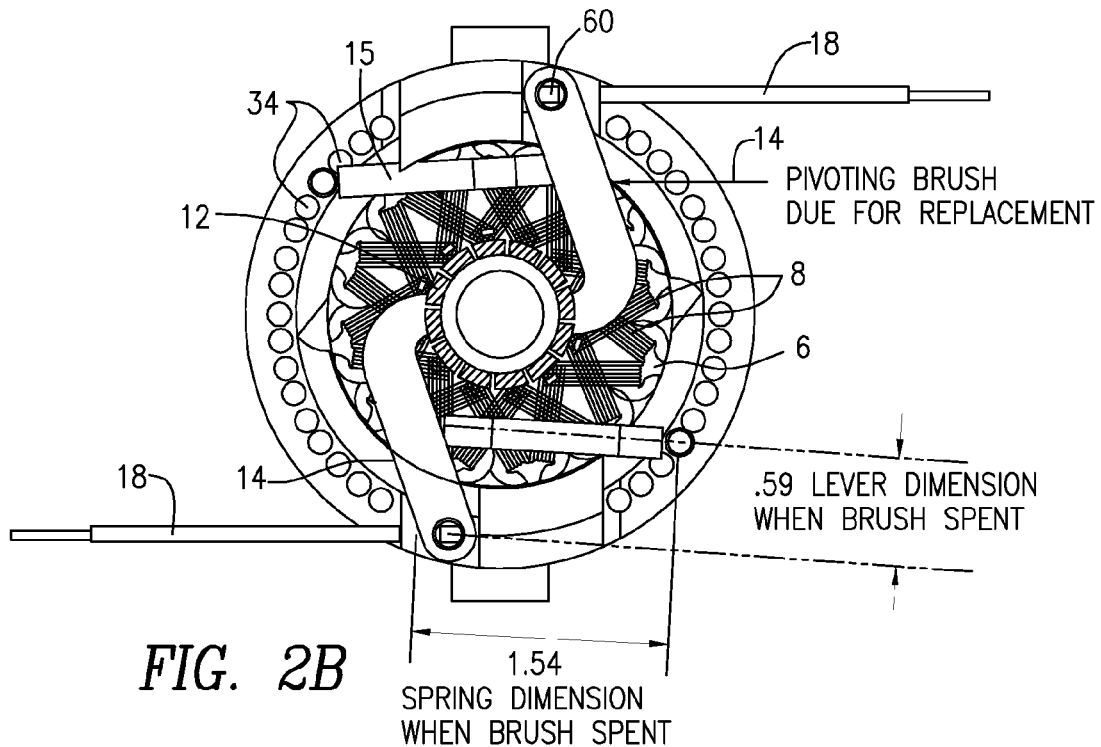
FIG. 2B is a cross sectional view of the motor shown in FIG. 2A taken through the line A-A', showing the brushes and commutator according to one embodiment of the disclosed subject matter.
Figure 2C:
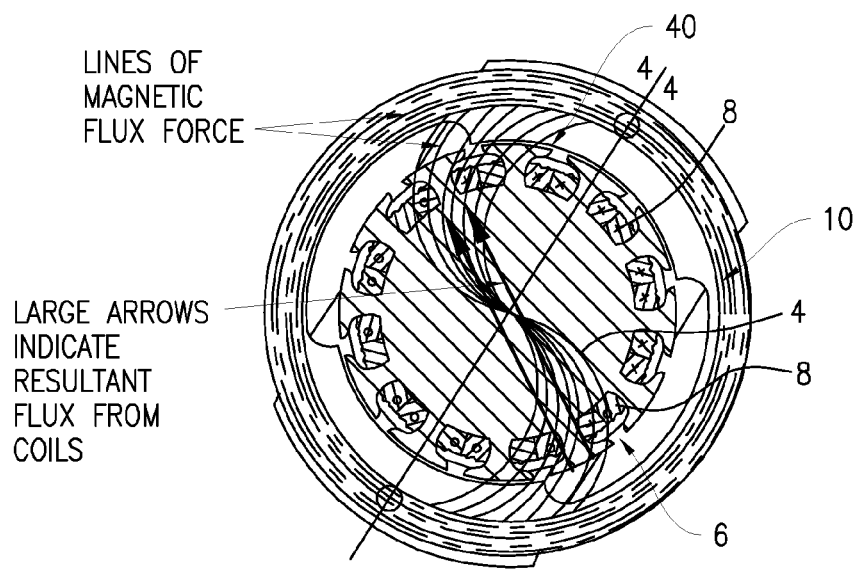
FIG. 2C is a cross sectional view of the motor shown in FIG. 2A taken through the line B-B' showing the coil winding in the rotor and the magnetic relationship to the stator according to one embodiment of the disclosed subject matter.

Now referring to FIGS. 2, 2A, 2B and 2C, in accordance with a first embodiment of the present disclosure, an electric motor 2 is disclosed wherein stator field coils/magnets are eliminated and the rotor coils are the only means of excitation of the magnetic field. As shown in FIGS. 2-2C, the electric motor includes rotor core 4 with slots 6, rotor coils 8 wound around and through the slots 6 in the rotor core 4, stator ring 10, commutator 12, brush 14, output shaft 16 and power in leads 18. Motor 2 may include rear bearing bell 20 and bearing mount 30. A brush spring 15 may be employed, discussed further hereinbelow. A small air gap 40 separates the rotor and the stator ring 10 surrounding it. The air gap 40 may be from about 0.008" to about 0.025". The coils 8 are wound and connected to the commutator 12 in a manner that induces many superimposed flux fields. The resultant flux from all the energized coils flows diametrically through the rotor core 4, and therefore can be misaligned with the pole plane to produce a torque to turn the rotor core 4. Now referring to FIG. 2C, it can be seen that when connected to a voltage source, the energized rotor coils 8 produce a resultant magnetic field which is misaligned with the central plane of the poles of a stator ring 10, and cause motor action without the need for stator field coils or permanent magnets. The coils 8 wound in the rotor core slots 6 are marked with symbols denoting the current direction, and lines of magnetic force are indicated. The large arrows indicate the resultant flux from the coil 8. Coil sections shown with blank, or no, cross-hatching are shown as shorted as a result of the brush 14 bridging commutator segments. The motor 2 can be employed to drive small high speed appliances. The elimination of the field coils also eliminates the need for extra insulation, significantly reducing the assembly time and the cost of material, and furthermore, making the motor electrically safer.

Figure 2D:
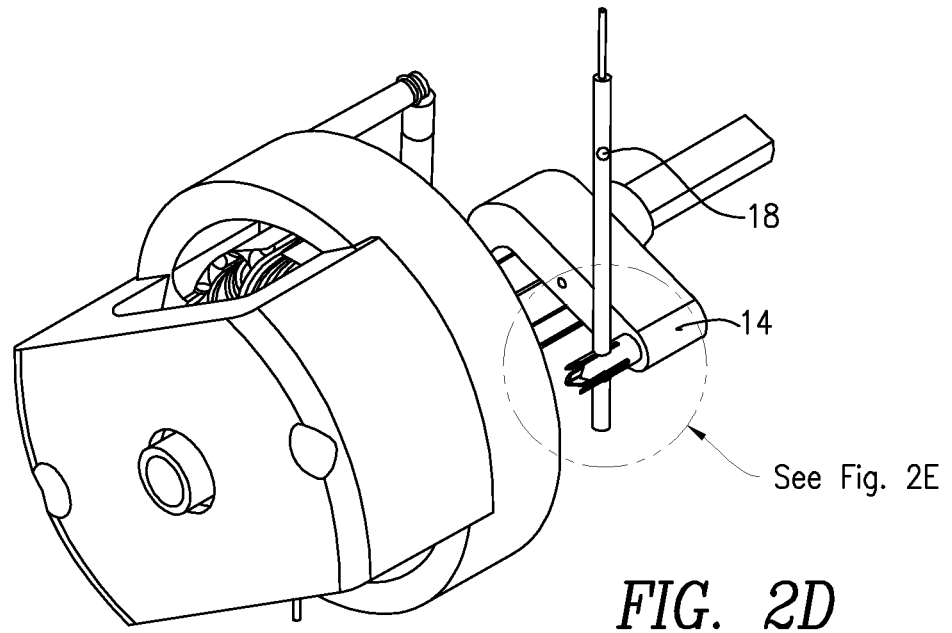
FIG. 2D is an enlarged partial view of the detail of connection of incoming electrical power in the motor of FIG. 2 according to one embodiment of the disclosed subject matter.
Figure 2E:
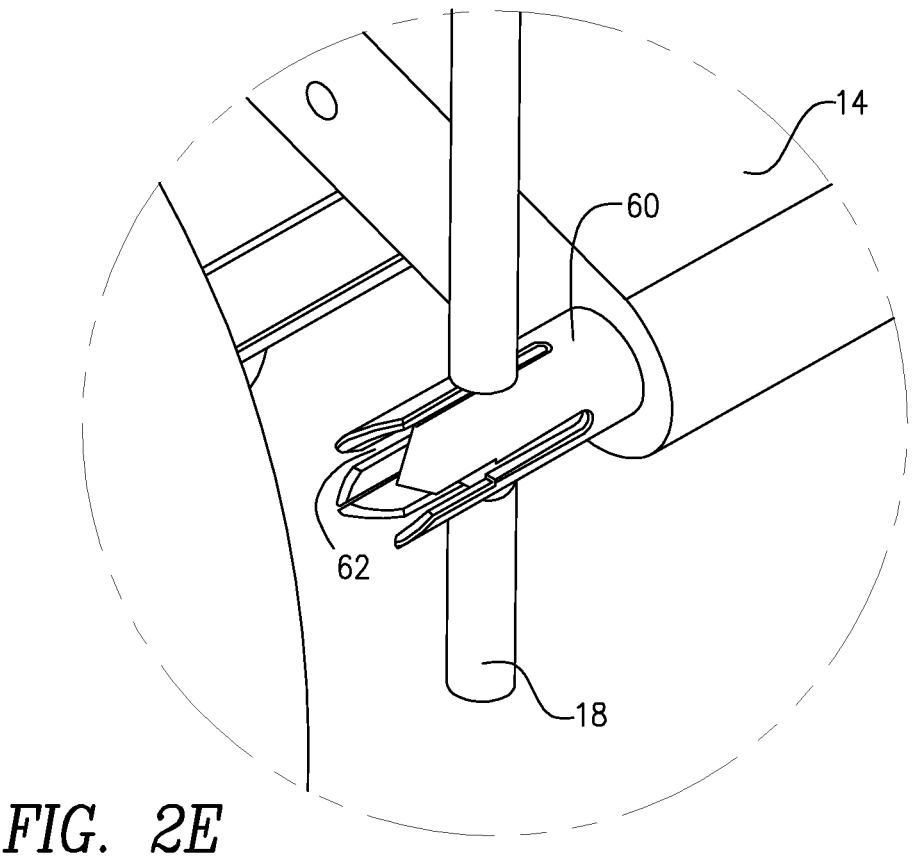
FIG. 2E is an enlarged partial perspective view of a brush pin connector as shown in FIG. 2D according to one embodiment of the disclosed subject matter.
Figure 2F:
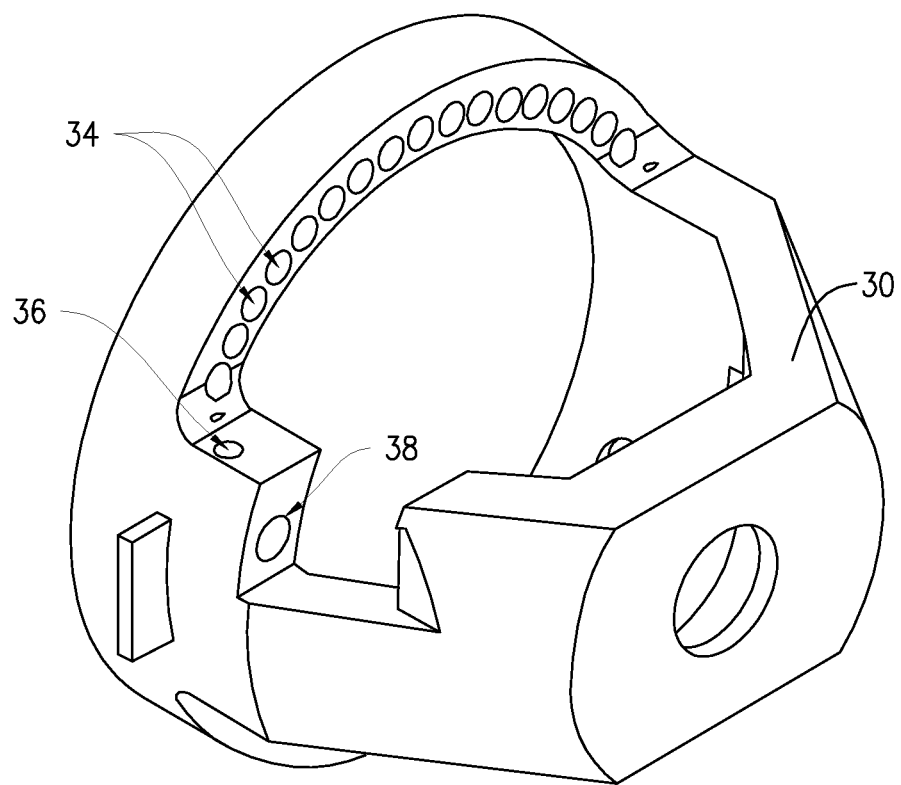
FIG. 2F is an enlarged partial perspective view openings formed for adjusting the angular position of poles relative to brushes, and openings for receiving lead wire and pivot pins according to one embodiment of the disclosed subject matter.

With further reference to FIG. 2F bearing mount 30 may include openings 34 for adjusting the angular position of poles relative to brushes 14. This design may be applied to the remaining embodiments disclosed herein.

In addition to achieving greater efficiency, elimination of stator field coils also leads to simpler motor design wherein the direction of rotation can be reversed by simply adjusting the stator yoke angular position in respect to the brush assembly. This is in contrast to the traditional commutated motor wherein the direction of rotation cannot be changed by simply reversing the polarity of the current. One way of changing the rotation in the traditional commutated motor is to alter the coil winding direction. However, this is an impractical way to make immediate changes. Immediate changes have usually required switching to select appropriate stator coils or switching a reversing gear box, both being an additional relatively high cost. The method of angularly adjusting the poles with respect to the brush assembly, as proposed in accordance with all embodiments herein, is a more immediate and low cost solution to reverse the direction of rotation of the rotor.

The brush 14 may be a conventional brush known to those having ordinary skill in the art. In another embodiment, the brush 14 may be a pivoting brush as described in further detail hereinbelow.

As described herein the elimination of the extra stator field coils enables simple, more compact, lower weight and higher powered embodiments. It will be understood by those skilled in electric motor art that many alternative embodiments can be derived from the spirit of the coil elimination. For example, the commutation can be achieved by internal or external brushes or fixed or rotating brushes and the commutator can be cylindrical, or conical or facial and commutation can be mechanical as shown in this description or optical/electronic or electronic or other means. In addition, various embodiments detailed herein can utilize either winding techniques or printed circuit techniques. Also, the conductors, coils and commutator can be wound and connected in various configurations.

Figure 3:
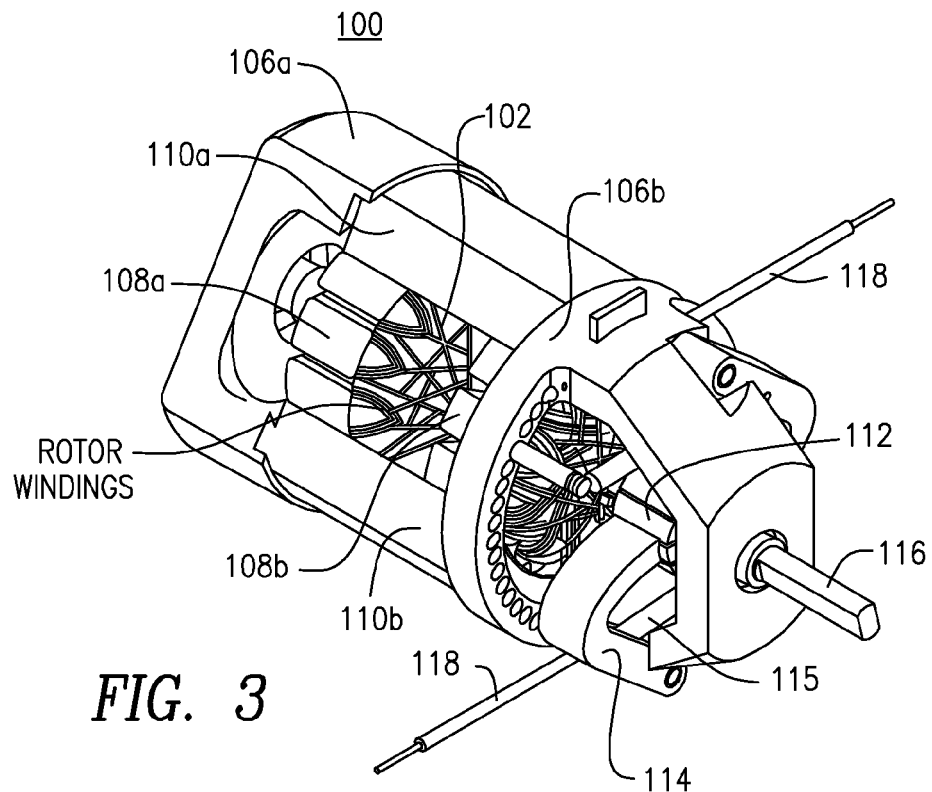
FIG. 3 is a perspective view of a motor designed according to one embodiment of the disclosed subject matter.
Figure 3A:
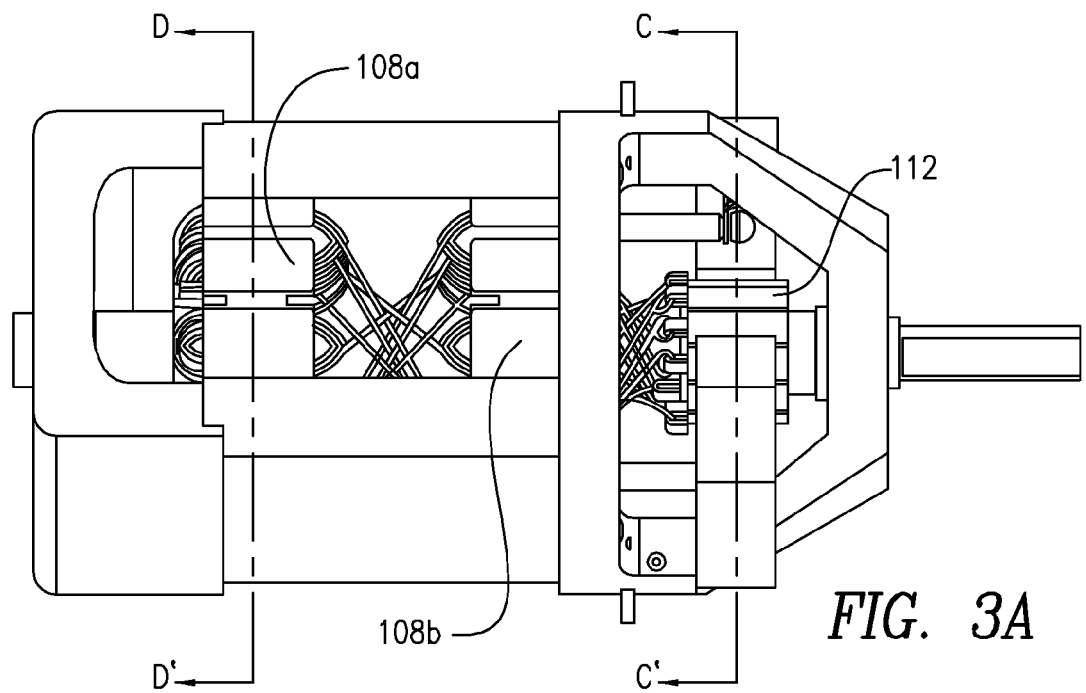
FIG. 3A is a side view of the motor shown in FIG. 3, with section planes indicated according to one embodiment of the disclosed subject matter.
Figure 3B:
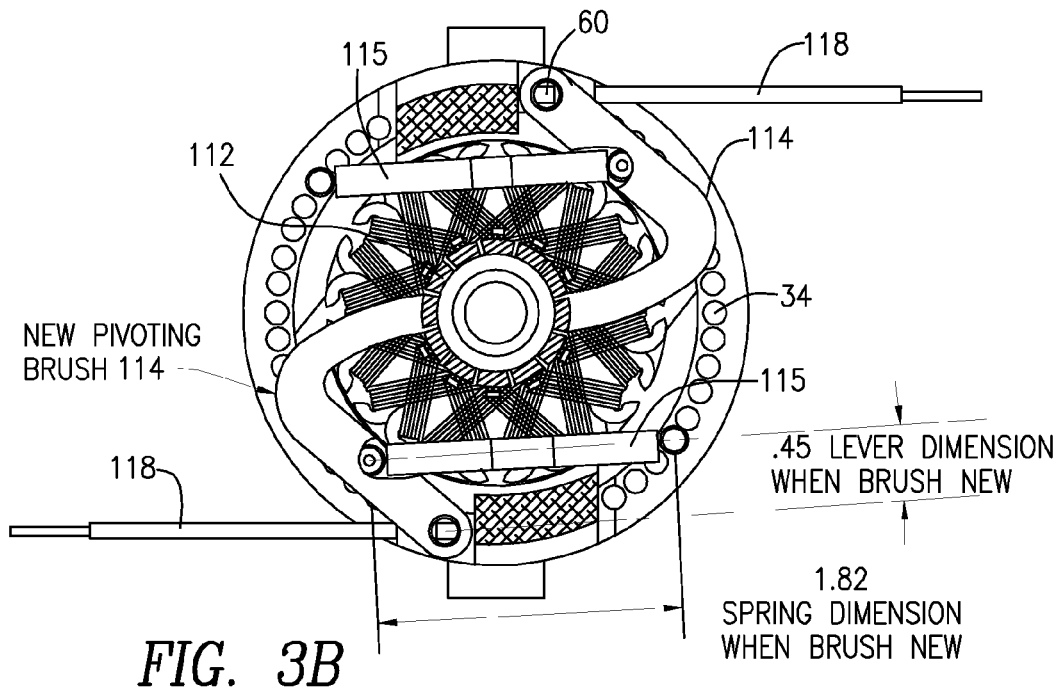
FIG. 3B is a cross sectional view of the motor shown in FIG. 3A through section C-C' showing the electric power input through brushes and commutator according to one embodiment of the disclosed subject matter.
Figure 3C:
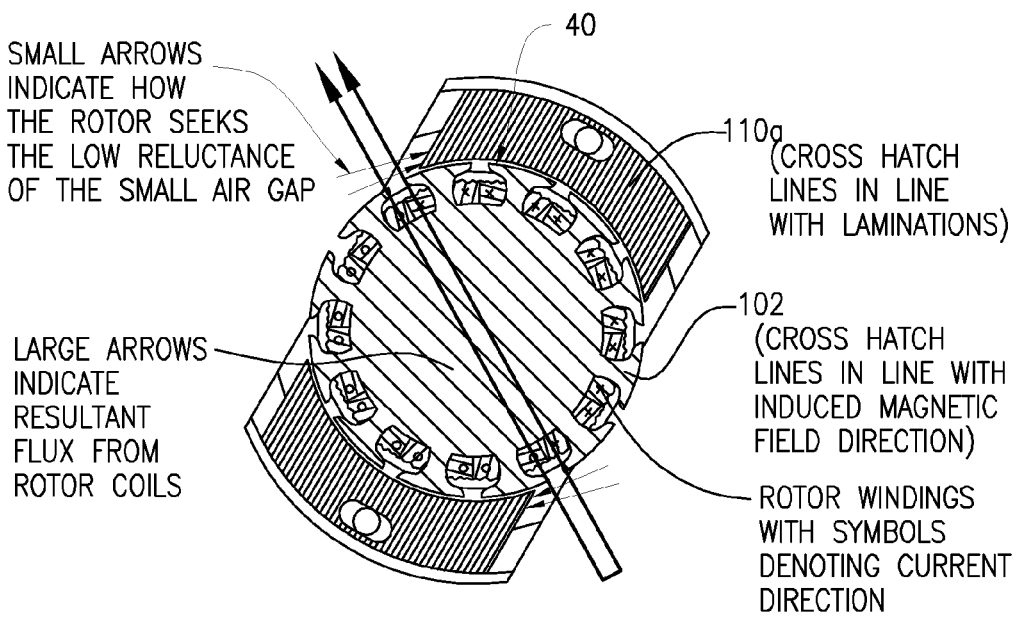
FIG. 3C is a cross sectional view of the motor shown in FIG. 3A through section D-D' showing the electric current directions according to one embodiment of the disclosed subject matter.

Now referring to FIGS. 3-3C in a second embodiment a motor 100 is disclosed which has the same principal of operation with the same relationship between stator and rotor components as the motor shown in FIG. 2, but is constructed differently. Rotor 102 has two coil banks 108a and 108b, stator elements which conduct the magnetic circuit are two stator bars 110a and 110b, parallel to the axis of the motor 100, connecting the motor bearing brackets 106a and 106b, commutator 112, brush 114, optionally spring 115, output shaft 116 and leads 118. In accordance with this embodiment, without being confined to a single theory of operation, the principle of the motor 100 (without field coils) is to produce torque by displacing part of the magnetic circuit so that nature is always trying to align the magnetic circuit, as in a compass, and the longitudinal length of the conductors in the coils windings is not a factor. But it is now essential to have coils to create a magnetic field, and the amount of magnetic flux is proportional to the amount of current flow and the number of turns in the coils. This means that the coils that make up the "bank" of magnetic field producing coils need not be of unnecessary longitudinal length. It is now the magnetic saturation of the rotor core arms around which the coils are formed which limits the compactness of the coil. Not only does this mean that the copper used in the coils can be minimized, but more importantly, it means that more than one bank of coils can be fitted within the same longitudinal space as is used for the currently used motors with field coils.

For example, when as shown in FIG. 3, two serially connected coil banks 108a and 108b are used, with one wound in one direction, while the other is wound in the other direction, when energized, the simultaneous magnetic field is opposite in each coil bank, that is the "north/south" direction is reversed. Then the stationary outer poles, stator bars 110a and 110b, which complete the magnetic circuit, can be parallel to the axis of the motor, with good permeability and eddy current resistance, arranged diametrically oppositely, connecting the bearing brackets 106a and 106b.

The magnetic circuit essentially comprises the two opposed magnetic flux fields of the two coil banks 108a and 108b and the two pole, or stator, bars 110a and 110b. The central axis, about which this magnetic circuit circulates, is approximately perpendicular to the motor axis. This important development surprisingly reduces the amount of pole metal, allows the rotor 102 to increase its radius to increase torque, opens the rotor 102 to a greater flow of cooling air and increases the power to weight ratio.

In contrast, the prior art universal motor shown in FIG. 1 with field coils and an outside enclosing pole yoke is too enclosed for good ventilation. Cooling in the prior art motor relies on air being forced through whatever opening it can penetrate and general conductance of heat from the inner to the outer parts of the motor. Also, the carbon dust from brush wear deposits on the motor parts and can compromise the commutator action by lodging between the segments and causing segment shorts.

The much more "open" design motor in accordance with FIGS. 3-3C is easier to ventilate and naturally stays cleaner. This, together with its smaller size, lower weight, lower cost and easier brush servicing makes it an attractive and useful motor in applications which require compactness and high speed.

In another embodiment, although the motor 100 shown in FIG. 3 is depicted having the second coil bank 108b angularly aligned with the first coil bank 108a, it may be angularly offset. When the coil banks 108a and 108b are aligned, the torque is momentarily slightly stronger but pulsates, which may be important for starting the motor 100. When offset, the torque is smoother, operating similarly to a 24 coil single bank rotor.

Several other benefits become immediately apparent. Smoother torque produces quieter operation. Multiple coil banks induce high torque with small rotor diameter. This is the formula for high speed and high power to weight ratio. Also, the ability to infinitely adjust the angular offset of the two coil banks 108a and 108b allows tailoring to suit the various practical end user requirements.

The embodiment shown in FIG. 3 is characterized by having the two coil banks 108a and 108b wound in reverse manner. However, it is possible to construct another embodiment (not shown) in which such coils are wound on two or more rotor cores, not in reverse manner. In such an embodiment, the magnetic circuit would be similar to the single coil bank motor shown in FIG. 2. This embodiment would have the same advantages as for the motor shown in FIG. 3, except it would not be as open and as easily cooled as the motor shown in FIG. 3.

For the benefit of those ordinarily skilled in the art of electric motor building an explanation follows of how motor action is achieved without the use of field coils. The windings in the rotor 102 are arranged as two electrically parallel branches of an electric series of coils and the ends of these coils are individually connected to segments of commutator 112. The magnetic field which they generate is due to the current which flows through the coils. This power is supplied via two brushes, fixed and positioned 180 degrees apart at opposite sides of the commutator 112, which provide current flow while allowing rotation of the rotor 102 and the commutator 112.

The present inventor has calculated that in a rotor with twelve coils, with the power transmitted via the brushes through a single commutator segment at each brush, the resultant magnetic force will theoretically be 7.728 times the magnetic force developed by a single coil. When the brushes bridge across two commutator segments and short out two of the coils, (which will be happening most of the time), the magnetic force will theoretically reduce to 7.464 times the magnetic force developed by a single coil. This is only a 3.5% difference. In a common wound rotor in present use, the central plane of this resultant magnetic force aligns approximately 120 degrees displaced from the brush plane. When power is applied across two diametrically opposed commutator segments, the loop or bank of coils becomes two electrically parallel branches. This will energize the coils and generate magnetic fields.

Now referring to FIG. 3C, which is a sectional cut through the rotor core and the windings of a coil bank 108a, each section of winding has the conventional symbol which represents the current direction, wherein an "x" means current going, an "o" means current coming. If the direction is according to the "right hand rule" vector convention, it can be seen that there is a resultant magnetic field, the magnitude and direction of which is represented by the large arrows.

Most of the magnetic lines of force will be concentrated within the rotor legs which are in the vicinity of the large arrows. If the poles (stator bars 110a and 110b) are located as shown in FIG. 3C, the lines of force will bend and flow to the pole metal. This force will pull the rotor 102 and apply a torque which will turn the rotor 102 in the clockwise direction.

When the motor is energized by alternating current, these directions change every cycle. It can be deduced from FIG. 3C that although the direction of the magnetic field reverses, the angular relationship with the poles (stator bars 110a and 110b) does not change and continues to apply the torque which propels the rotor 102 in the same direction.

FIG. 3C also demonstrates the action of the "twin" rotor, i.e., one having coil banks 108a and 108b, because each coil bank is wound so that the current flow is reversed. Again, as with the AC cycles, the angular relationship with the poles does not change but the direction reverses. Comparing the imaginary plane going through the axis of the motor 100 and through the center of each pole 110a and 11b, against the imaginary plane which represents the central alignment of the magnetic flux in the rotor 102, there will be an angular displacement between these two planes at which the torque, which rotates the rotor 102, will be at a maximum value. If this angular displacement is small there will be only a small force tending to remove the displacement. If this angular displacement is too large, for example, approaching 90 degrees, then there will be neutralizing as the forces balance and produce a very small resultant. But at some intermediary position, for example, at approximately 60 degrees, the magnetic lines of force will be very actively attempting to pull the coil assembly (rotor 102) into alignment with the poles (stators 110a and 110b).

Torque is defined as the product of the resultant pulling force, generated by the magnetic field, and the offset of the direction of this force, from the axis of the motor. Usually the width of the brush in the direction of rotation is just over the width of a commutator segment. Then most of the time during rotation, the brush will be contacting two adjacent segments. By adjusting the brush mounting relative to the pole plane described above, a maximum value of torque can be found. This does not need to be measured by a dynamometer. It can be determined by simply applying a constant drag to the motor (such as an impeller) and testing, at constant voltage, to see at which angular position the motor achieves the highest rotational speed. Interestingly, the same angular adjustment is just what is required to reverse direction of the rotor 102, by simply locating the brush mounting at a similar offset angle, but at the other side of the imaginary pole line. It will be apparent to the skilled artisan that once the best position is determined for a particular application, a commercial embodiment of the motor will have the proper position fixed. From a practical standpoint one skilled in the art will recognize the usefulness of accurately maintaining the experimentally concluded angular positions of the brush mounting and the commutator relative to the poles. This easy reversal is particularly advantageous and can be utilized in those applications which require reversed rotation. Currently available universal motors cannot be so easily reversed and the means to do so is complex and costly.

Figure 4:
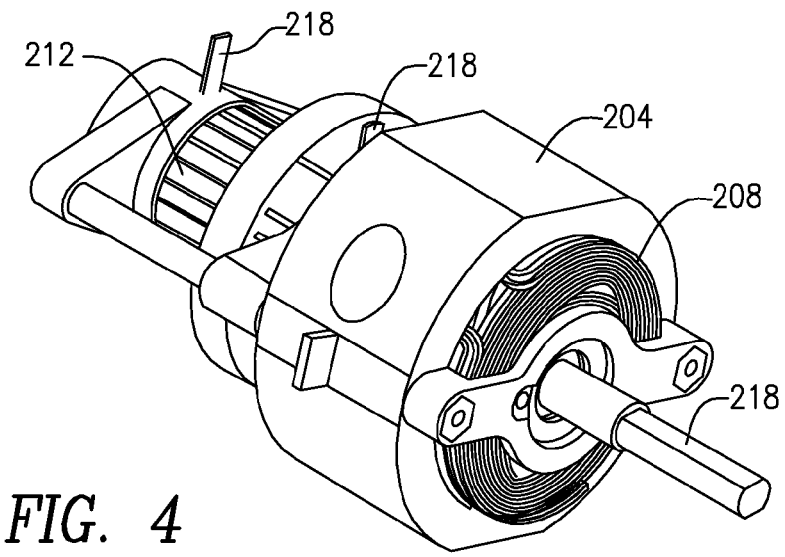
FIG. 4 is a perspective view of a motor according to one embodiment of the present disclosure.
Figure 4A:
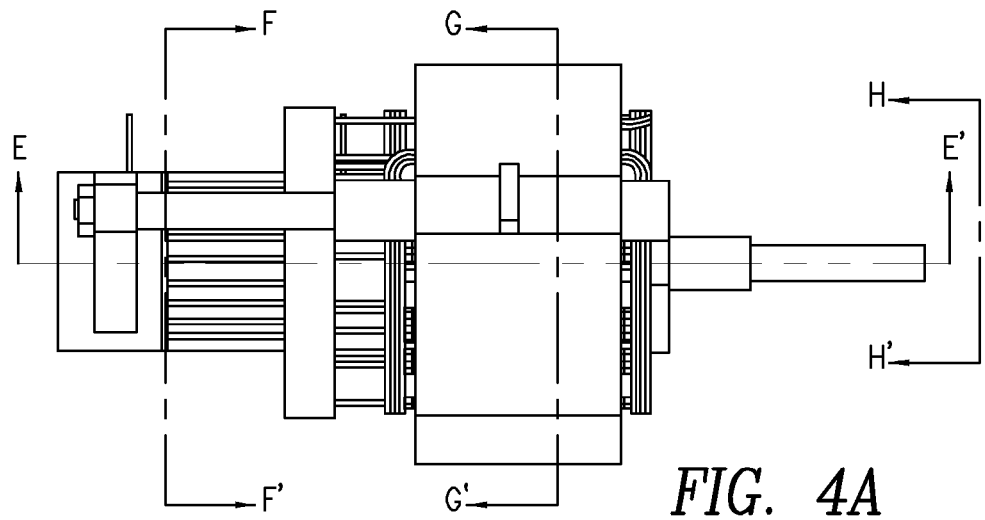
FIG. 4A is side view of the motor shown in FIG. 4, with section planes indicated according to one embodiment of the disclosed subject matter.
Figure 4B:
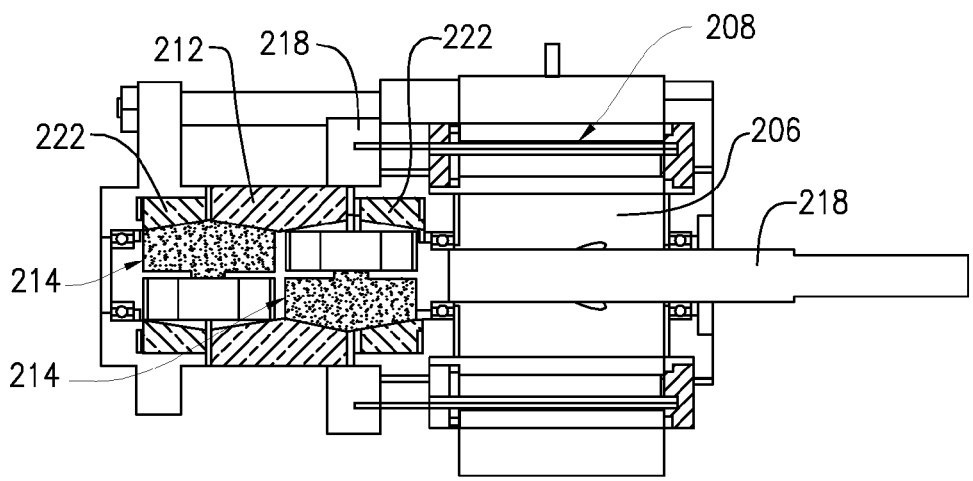
FIG. 4B is a cross sectional view, aligned with the motor axis, taken through the line E-E' of the motor shown in FIG. 4A showing the brushes, the commutator, the pole piece, the bearings and the stator yoke according to one embodiment of the disclosed subject matter.
Figure 4C:
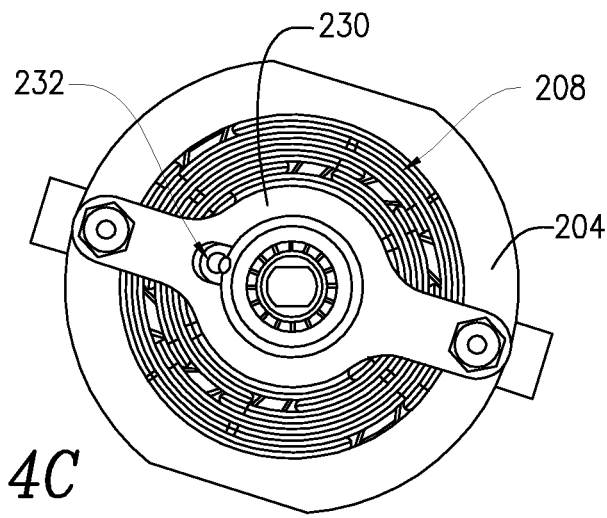
FIG. 4C is an end view of the motor shown in FIG. 4A taken through the line H-H' showing the access for adjusting the internal pole piece according to one embodiment of the disclosed subject matter.
Figure 4D:
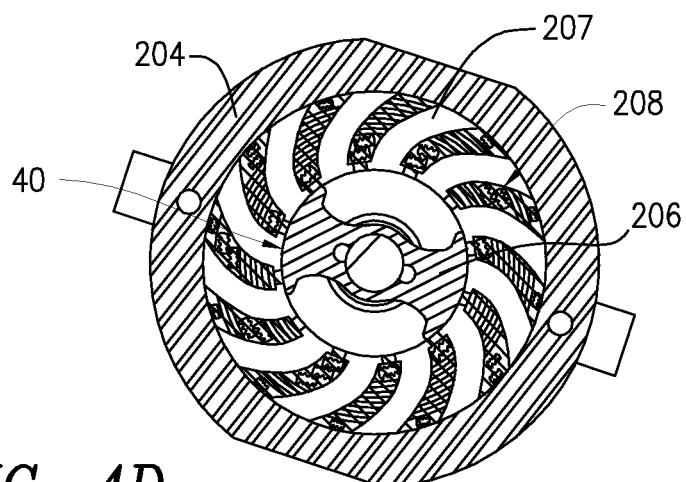
FIG. 4D is a cross sectional view of the motor shown in FIG. 4A taken through the line G-G' showing the rotating pole piece according to one embodiment of the disclosed subject matter.
Figure 4E:
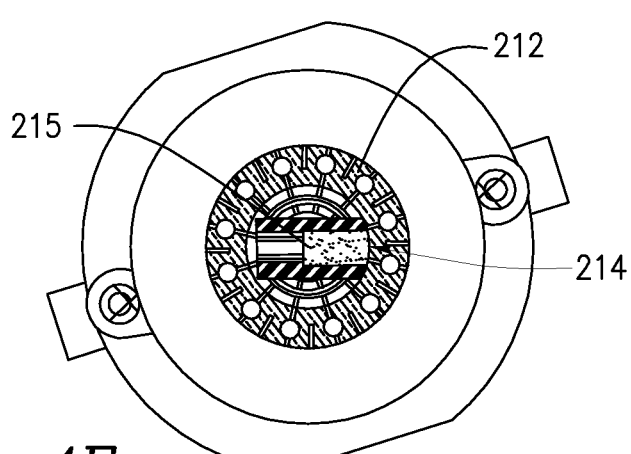
FIG. 4E is a cross sectional view, perpendicular to the motor axis, of the motor shown in FIG. 4A taken through the line F-F' showing the brush and commutator according to one embodiment of the disclosed subject matter.

Now referring to FIGS. 4-4C, in a further embodiment a motor 200 is provided having a stator yoke 204, rotor pole element 206, stator windings 208, commutator 212, brushes 214, electrical connectors 218 output shaft 220 and slip rings 222 and 222 in which the conductors (i.e., stator yoke 204 and windings 208) and commutator 212 are stationary and the rotor pole element 206 revolves. With further reference to FIG. 4D, stator windings 208 are wound on stator spider 207. Stator yoke 204 is disposed annularly around stator windings 208 and rotor pole element 206, with an air gap 40, for example from about, of about 0.008 to about 0.025 inches between rotor pole element 206 and the stator windings 208. Brushes 214 are coupled to rotor pole element 206 and turn inside stator windings 208, commutator 212 and slip rings 222 connectable to electrical connectors 218. One or more of brushes 214 may be mounted conventionally to the rotor pole element 206 or pivotably mounted. Now with further reference to FIG. 4E, in one embodiment, brush 214 may be coupled to rotor pole element 206 via a brush spring 215, the advantages of which are discussed hereinbelow.

Essentially this embodiment is designed so that the stator and brush assembly of the embodiment of FIG. 2, become the rotor, and the wound rotor becomes the external stator.

Figure 4F:
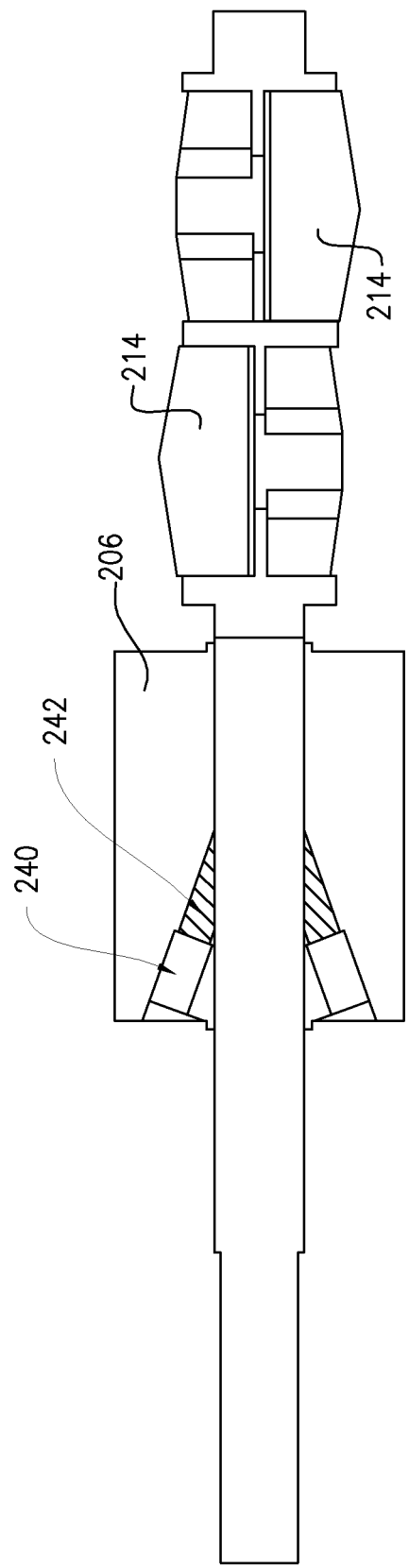
FIG. 4F is a side cross sectional view of an embodiment of an adjustment device for according to one embodiment of the disclosed subject matter.

The stator windings 208 may be any suitable conducting material such as wire, flexible printed material, etc. With further reference to FIGS. 4C and 4F, a mounting bracket 230 includes an opening 232 for accessing an adjustable element such as one or more set screws 240 fitted to a collar or plug 242 which may clamp the rotor pole element 206 to a shaft. The adjustable element may be used to adjust the angular position of the poles relative to the brushes 214.

The motor 200 has many advantages. One is that the revolving parts are easier to balance. Another advantage is that centrifugal force keeps the brushes 214 in good contact with the internal surface of the commutator 212. Another advantage is that the poles of the rotor are easily angularly adjusted relative to the brush assembly. Another advantage is that the brushes 214 and commutator 212 are easier to recondition than brushes and commutators of conventional electric motors, for example, consider hand reaming an inside diameter versus turning an outside diameter. In the motor 200, the commutator 212 and brushes 214 are easily removed for replacement as the brushes are simply coupled to the rotor pole element and output shaft 220. The electrical connector 218 connecting the stator windings 208 to the segments of the commutator 212 is preferably a 24 pin connector, enabling simple disconnection and reconnection. It is believed that a complete renewal of the brush 214 and commutator 212 assembly can be done in less than five minutes. Another advantage is that the windings of wire are stationary and not subject to centrifugal forces and tensile strength failure.

Good brush design is essential to the efficient operation and extending the useful life and value of any electric motor. Currently, available universal motors use brushes which are linearly guided and must be connected to electrical power via flexible pigtails. This requires an arrangement which is costly, fragile and subject to breakage. Now referring to FIGS. 2B and 3B, for example, embodiments of brush apparatus are disclosed including a pin 60 upon which the brushes 14, 114 are pivotably mounted, wherein the pin 60 also delivers the electrical power, without the need for a flexible pigtail, so that the brushes 14, 114 press against the commutator with a path which is an arc instead of linear, requiring no other guiding. This design is not only simpler, but makes replacement of the brushes very easy, as there is no wire pigtail to disassemble and assemble. A spring 15, 115 is mounted to a portion of the motor such as a motor housing or stator ring and at the other end to a brush 14, 114.

The brush apparatus in accordance with this embodiment enables a simple and novel method of adjusting for wear. This wear gradually reduces the spring force maintaining the brush to commutator contact. It has been found that establishing the proper contact unit pressure between the brush and the commutator influences the life of the brush and commutator. If the pressure is too great the brush wears away due to excess friction. If the pressure is too low, the brush and commutator wear due to electrical spark erosion. By simply arranging the spring 15, 115 so that as the brush 14, 114 wears, the torque arm applied to the brush increases in inverse proportion to the loss of spring force, the ideal unit pressure can be kept within a very small range, regardless of the amount of brush wear and spring relaxation. Comparing FIGS. 2B and 3B, it can be seen that the pivoting brush 14 due for replacement in FIG. 2B still retains ideal contact as does the new pivoting brush 114 shown in FIG. 3B.

Another method of maintaining the ideal unit brush pressure is to employ a brush having a varying cross-section. Again, the ideal unit pressure can be kept within a very small range, regardless of the amount of brush wear and spring relaxation. Alone or in combination, these two methods enable extremely close brush pressure consistency. Both these methods are far more elegant than the complex so called constant force spring arrangements seen on existing motors which are at best very difficult to apply to small motors.

Moreover, brushes tend to get hot during operation of the motor. Although this is not problematic for carbon brushes since these become better electrical conductors when hot, using the pivot mounted brushes disclosed herein in conjunction with the "open" design motors disclosed herein allows ample air cooling which provides a more consistent condition as compared with the usual close linearly guided design.

Reliable electrical connection from the power input to the motor is essential. Also, for motors designed for consumer products which are used only intermittently, such as leaf blowers which sometimes go unused for a year before being suddenly needed for leaf removal, the method of connection must be very sound. Also, the connection must be resistant to vibration during high speed operation. Additionally, it must be applied in a cost effective productive manner. In sum, a good electrical connection is essential.

Now referring to FIG. 2D, a pivoting brush 14 is mounted on a pivot pin 60. In one embodiment, the pivot pin 60 is a brass tubular pin. At one end, it supports and makes electrical contact with the pivoting brush 14. At the other end it has slots 62 which are sized and formed to cut into and displace the insulation of the lead wire 18 and to then be a tight fit on the conductors of the lead wire 18.

With further reference to FIG. 2F bearing mount 30 may include an opening 36 formed therein for receiving lead wire 18 and an opening 38 for receiving pivot pin 60 according to one embodiment of the disclosed subject matter. The end of the lead wire 18 may be placed into opening 36, which may be formed in the insulating material of the bearing mount 30. The pivoting pin 60 may be inserted into opening 36 which intersects perpendicularly the opening 38 into which the lead wire 18 is placed. Applying pressure to the pin 60 causes the pin 60 to penetrate the lead wire 18 insulation and tightly contacts the conductors with a spring loaded gas tight contacting grip. After this speedy and productive connection is accomplished the only places into which corrosive elements can invade are the small clearances between the openings and the elements inserted in them. These clearances can be easily sealed with a long-lasting cement. This connection design may be applied to the remaining embodiments disclosed herein.

Although the systems and methods of the present disclosure have been described with reference to exemplary embodiments thereof, the present disclosure is not limited thereby. Indeed, the exemplary embodiments are implementations of the disclosed systems and methods are provided for illustrative and non-limitative purposes. Changes, modifications, enhancements and/or refinements to the disclosed systems and methods may be made without departing from the spirit or scope of the present disclosure. Accordingly, such changes, modifications, enhancements and/or refinements are encompassed within the scope of the present invention.

What is claimed is:

1. An electric motor comprising a rotor core and rotor coils disposed around the rotor core, a commutator and a stator ring, the motor having no auxiliary magnetic field, wherein the rotor coils when energized produce a magnetic field which is misaligned with the central plane of the poles of the stator ring to produce a torque to turn the rotor core, wherein the magnetic field produced by the rotor coils is the only magnetic field operable to turn the rotor core.

2. The electric motor according to claim 1 wherein an air gap is present between the rotor and the stator ring.

3. The electric motor according to claim 1 comprising at least one brush pivotably connected to a housing of the motor.

4. The electric motor according to claim 3, further comprising a pivot pin extending from an end of the brush to a housing of the motor, the pivot pin operable to pivotably connect the at least one brush to the housing, and a spring having one end connected to the brush and another end connected to a housing of the motor.

5. The electric motor according to claim 4, the pivot pin comprising an opening operable to receive an electrical lead.

6. An electric motor comprising at least one rotor core having two rotor coil banks disposed around the at least one rotor core, a commutator and two stator bars disposed parallel to a long axis of the rotor core, the motor having no auxiliary magnetic field, wherein the rotor coil banks when energized produce a magnetic field which is misaligned with the central plane of the poles of the stator ring to produce a torque to turn the rotor core, wherein the magnetic fields produced by the rotor coil banks are the only magnetic fields operable to turn the rotor core.

7. The electric motor according to claim 6 wherein the coil banks are wound in opposite directions.

8. The electric motor according to claim 6 wherein the coil banks are wound in the same direction.

9. The electric motor according to claim 6 comprising more than one rotor core.

10. The electric motor according to claim 6 wherein the coil banks are axially aligned.

11. The electric motor according to claim 6 wherein the coil banks are angularly offset.

12. An electric motor according to claim 6 comprising at least one brush pivotably connected to a housing of the motor.

13. The electric motor according to claim 6, further comprising a pivot pin extending from an end of the brush to a housing of the motor, the pivot pin operable to pivotably connect the at least one brush to the housing, and a spring having one end connected to the brush and another end connected to a housing of the motor.

14. The electric motor according to claim 6, the pivot pin comprising an opening operable to receive an electrical lead.

15. An electric motor comprising a rotor core, a commutator and a stator ring having stator windings disposed around the stator ring, wherein the stator windings when energized produce a magnetic field which is misaligned with the central plane of the poles of the rotor core to produce a torque to turn the rotor core, wherein the magnetic field produced by the stator windings is the only magnetic field operable to turn the rotor core, the motor having no auxiliary magnetic field, and wherein the commutator and stator ring are stationary.

16. The electric motor according to claim 15 comprising at least one brush pivotably connected to the rotor core.

17. The electric motor according to claim 15, further comprising a pivot pin extending from an end of the brush to the rotor core, the pivot pin operable to pivotably connect the at least one brush to the rotor core, and a spring having one end connected to the brush and another end connected to the rotor core.

18. The electric motor according to claim 15, the pivot pin comprising an opening operable to receive an electrical lead.

19. A brush assembly for an electric motor according to claim 1, comprising a brush and a spring, the brush operable to pivotably connect at one end to a motor part which is fixed relative to the brush, the spring operable to connect at one end to the brush and at another end to a motor part which is fixed relative to the brush, the brush having a free end positionable to contact a commutator.

20. The brush assembly according to claim 19 further comprising a pivot pin extending from the end of the brush operable to pivotably connect at one end to a motor part which is fixed relative to the brush.

21. The brush assembly according to claim 19 the pivot pin comprising an opening operable to receive an electrical lead.

\* \* \* \* \*

UNITED STATES PATENT AND TRADEMARK OFFICE
CERTIFICATE OF CORRECTION

| | | |
|---|---|---|
| PATENT NO. | : 8,643,256 B2 | Page 1 of 1 |
| APPLICATION NO. | : 13/156149 | |
| DATED | : February 4, 2014 | |
| INVENTOR(S) | : Anthony Freakes | |

It is certified that error appears in the above-identified patent and that said Letters Patent is hereby corrected as shown below:

In the Claims

Col. 8, Line 35-40

Claim 6 should read:

-- 6. An electric motor comprising at least one rotor core having two rotor coil banks disposed around the at least one rotor core, a commutator and two stator bars disposed parallel to a long axis of the rotor core, the motor having no auxiliary magnetic field, wherein the rotor coil banks when energized produce a magnetic field which is misaligned with the central plane of the poles of the stator bars to produce a torque to turn the rotor core, wherein the magnetic fields produced by the rotor coil banks are the only magnetic fields operable to turn the rotor core. --

Signed and Sealed this
Twenty-ninth Day of April, 2014

Michelle K. Lee
*Deputy Director of the United States Patent and Trademark Office*